(12) United States Patent
Lin

(10) Patent No.: US 7,303,240 B2
(45) Date of Patent: Dec. 4, 2007

(54) FITTING STRUCTURE OF VEHICLE WHEEL COVER

(76) Inventor: Rocky Lin, 9F.-5, No. 189, Sec. 2, Keelung Rd., Sinyi District, Taipei City 110 (TW)

( * ) Notice: Subject to any disclaimer, the term of this patent is extended or adjusted under 35 U.S.C. 154(b) by 168 days.

(21) Appl. No.: 11/196,414

(22) Filed: Aug. 4, 2005

(65) Prior Publication Data

US 2007/0029866 A1 Feb. 8, 2007

(51) Int. Cl.
*B60B 7/12* (2006.01)
(52) U.S. Cl. .................. 301/37.32; 301/37.102
(58) Field of Classification Search .......... 301/37.101, 301/37.102, 37.31, 37.32, 37.33, 37.42; 403/305
See application file for complete search history.

(56) References Cited

U.S. PATENT DOCUMENTS

| | | | | |
|---|---|---|---|---|
| 4,712,838 A | * | 12/1987 | Berg et al. | 301/37.41 |
| 5,128,190 A | * | 7/1992 | Kang | 428/99 |
| 5,188,428 A | * | 2/1993 | Carter, III | 301/37.11 |
| 5,305,573 A | * | 4/1994 | Baumann | 52/726.1 |
| 5,895,166 A | * | 4/1999 | Tsai | 403/4 |
| 6,425,640 B1 | * | 7/2002 | Hussaini | 301/37.33 |
| 6,860,568 B2 | * | 3/2005 | Nunes | 301/37.23 |
| 2004/0261244 A1 | * | 12/2004 | Colarusso et al. | 29/456 |
| 2005/0012383 A1 | * | 1/2005 | Hsieh | 301/37.102 |

FOREIGN PATENT DOCUMENTS

| | | | |
|---|---|---|---|
| DE | 3741113 | * | 6/1989 |
| EP | 0149935 | * | 7/1985 |
| JP | 60-35602 | * | 2/1985 |

OTHER PUBLICATIONS

European search report dated Feb. 8, 2006, EP 05017417.

* cited by examiner

*Primary Examiner*—Russell D. Stormer

(57) ABSTRACT

A fitting structure for a vehicle wheel cover, having an open loop formed by a curved bar, an elongate connecting cover, an adjusting nut and a plurality of fitting seats mounted to the loop. The loop has at least one end terminated with a bent portion and the other end formed with external threads. The connecting cover movably covers the first and second ends, and the adjusting nut is engaged with the external threads of the second end. Each of the fitting seats has a seat member, a holding member extending from one side of the seat for holding the loop, and a buffer element mounted to the seat member at one side opposite to the holding member. The seat member includes a displacement slot allowing one end of the buffer element to extend through. The other end of the buffer member is configured to engage with a screw member extending through the wheel cover.

11 Claims, 4 Drawing Sheets

FITTING STRUCTURE OF VEHICLE WHEEL COVER

BACKGROUND

The currently invention relates in general to a fitting structure of a vehicle wheel cover, and more particularly, to a fitting structure that installs the wheel covers on the wheel disks of large vehicle such as trucks and buses.

U.S. Pat. No. 5,128,190 discloses a fixing device for fitting wheel covers on wheel disks of large vehicles such as trucks and buses. The fixing device includes an open loop with two straight ends which are formed with right hand and left hand threads, respectively. The straight ends can thus be joined with each other by a nut. By turning the nut, the diameter of the loop can be adjusted. However, as the nut is engaged with the straight ends by means of threads, a large torque is required for turning the nut. Further, as it is difficult to determine the length of the engaged portions between the nut and the straight ends, disengagement with the loop is unavoidable during adjustment. In addition, the fabrication of a nut with two opposing ends threaded in opposite directions is also difficult.

BRIEF SUMMARY

A fitting structure for a wheel cover is provided to conveniently adjust with the size of the wheel disk and to easily fit the wheel cover on the wheel disk. The fitting structure also prevents the wheel covers mounted to the wheel disks from being stolen.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
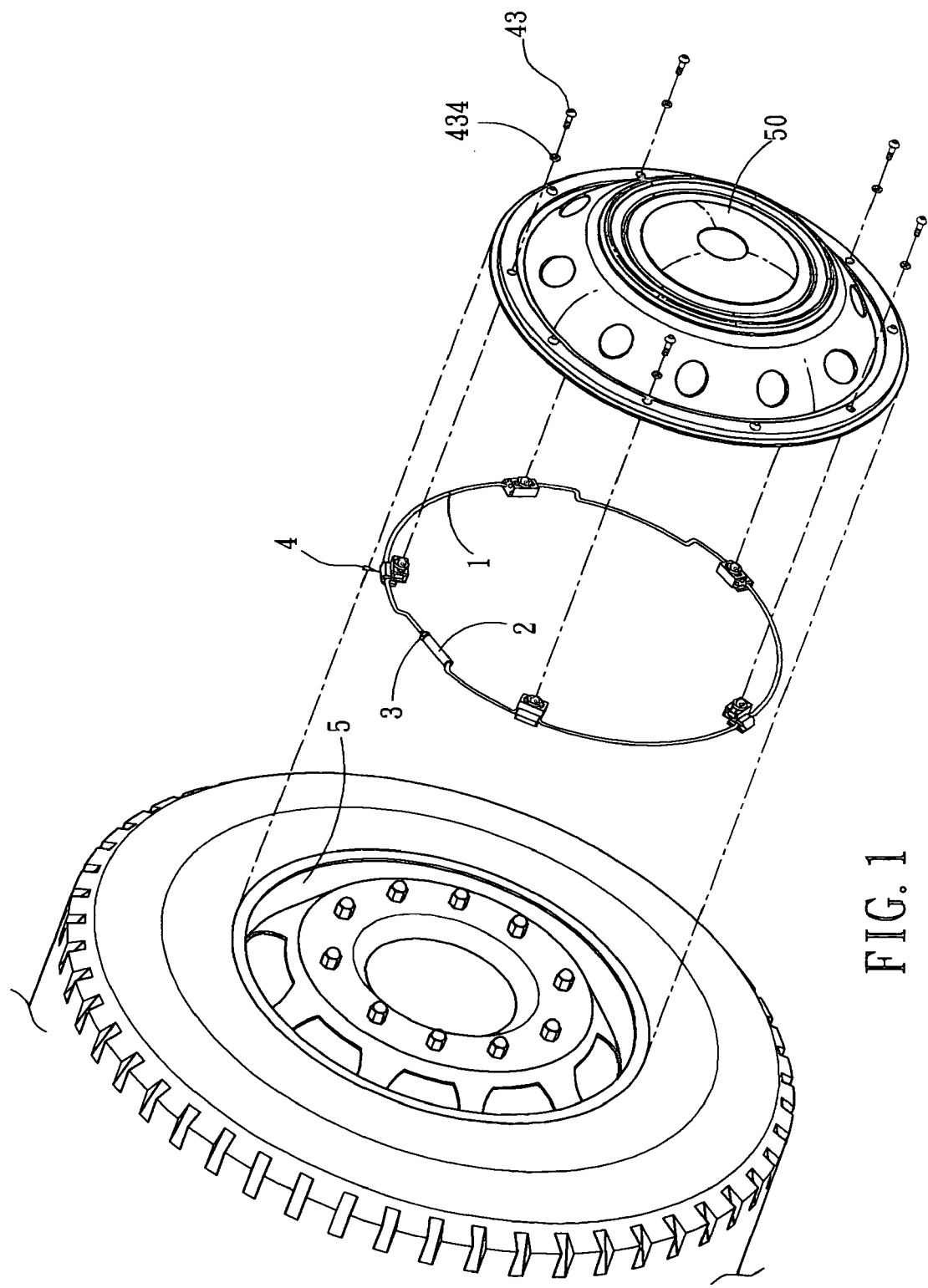
FIG. 1 illustrates a perspective view of a fitting structure for fitting a wheel cover on a wheel disk.
Figure 2:
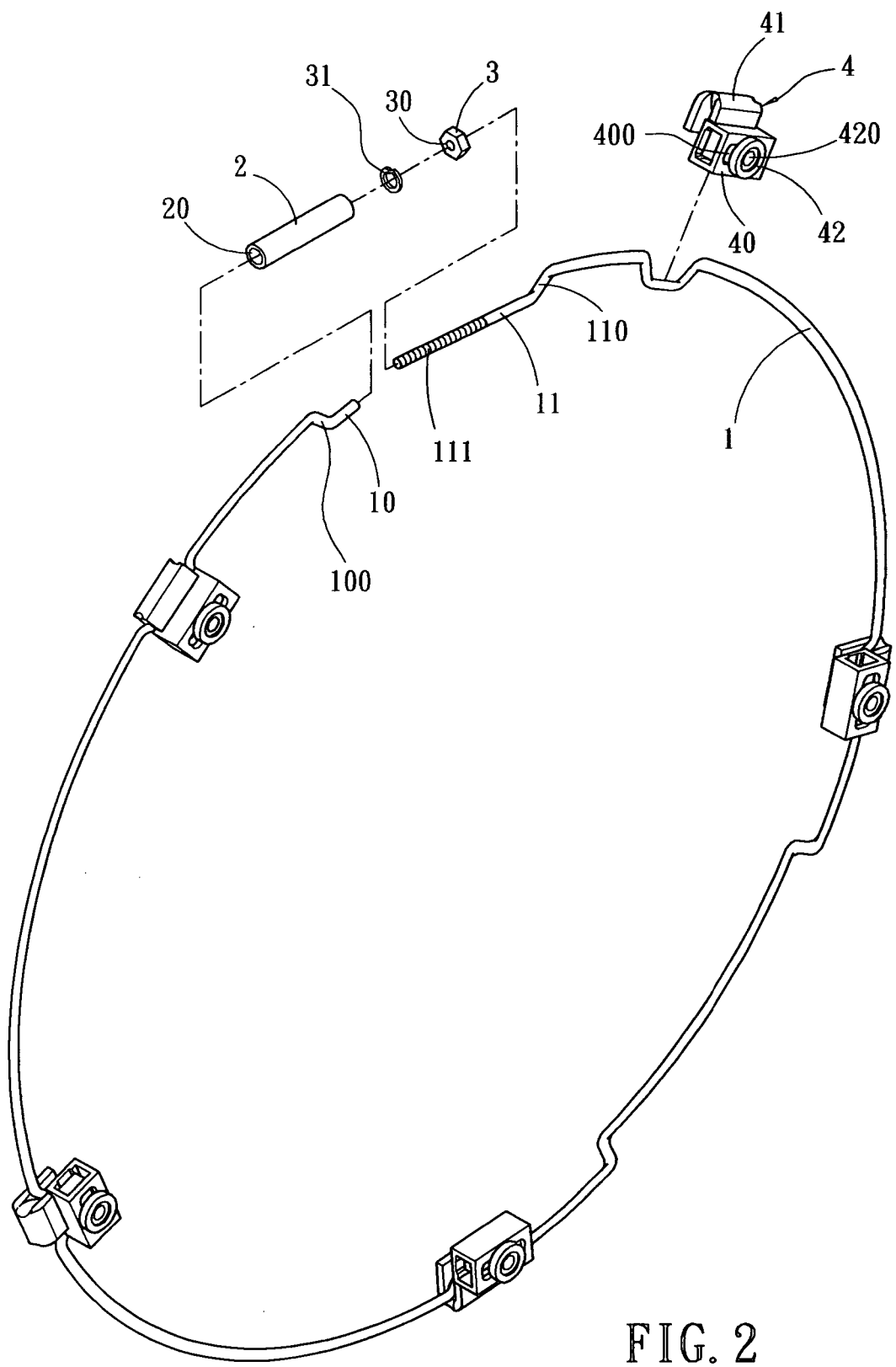
FIG. 2 shows an exploded view of the fitting structure.

FIG. 1 shows a perspective view of a fitting structure for fitting a wheel cover to a wheel disk, and FIG. 2 illustrates an exploded view of the fitting structure. As shown, the fitting structure to be fitted between a wheel disk 5 and a wheel cover 50 includes a loop 1, a connecting cover 2, an adjusting nut 3 and a plurality of fitting seats 4.

The loop 1 includes a bar curved into a substantially circular shape with an opening between two opposing ends, namely, a first end 10 and a second end 11. Therefore, the loop 1 can be adjusted with various diameters to be fitted to the rims of various types of wheel disks 5. At least one of the first and second ends 10 and 11 is terminated with a bent end. In this embodiment, each of the first and second ends 10 and 11 is terminated with a bent portion 100 and 110, respectively. The first end 10 is shorter than the second end 11, and both the first and second ends 10 and 11 have a straight configuration. In addition, threads 111 are formed on the second end 11.

The connecting cover 2 includes an elongate tubular body movably sheathing the first and second ends 10 and 11. The connecting cover 2 has a hollow channel 20 allowing the first and second ends 10 and 11 inserted therein from two opposing ends of thereof. The adjusting nut 3 includes internal threads 30 to engage with the threads 111 of the second end 11 at one end of the connecting cover 2. Therefore, by turning the adjusting nut 3, the loop 1 can be adjusted with various diameters. A screw spring washer 31 is preferably installed on the second end 11 between the adjusting nut 3 and the connecting cover 2 to provide spring force that avoids the adjusting nut 3 to be loosened from the second end 11.

The fitting seats 4 are mounted to various positions of the loop 1. Each of the fitting seats 4 includes a hollow seat 40, a holding part 41 and a buffer element 42. The seat 40 includes a displacement slot 400 extending therethrough, such that the buffer element 42 attached thereon can extend in the slot 400 and adjust the position thereof. The holding part 41 extends from the hollow seat 40 at a side opposing to the buffer element 42. Preferably, the holding part 41 is fabricated from resilient materials such as rubber that can exert spring force and restore its original shapes while being deformed by external force. The holding part 41 is preferably formed with a U shape such that the loop 1 can be inserted therein and held thereby. The buffer element 42 is perforated with a threaded hole 420, such that a screw member 43 (as shown in FIG. 1) can be engaged with the buffer element 42. A rubber washer 434 is preferably applied between the screw member 43 and the buffer element 42. As shown in FIG. 1, the wheel cover 50 is formed with a plurality of through holes allowing the screw member 43 to extend through. Thereby, the wheel cover 50 can be mounted to the loop 1 by engaging the screw members 43 with the buffer element 42, which is a part of the fitting seat 4 fitted to the loop 1. When the loop 1 as well as the wheel cover 50 fitted thereto is mounted to the wheel disk 5, the buffer element 42 and the washer 434 provide the buffering effect and absorb vibration, such that the screw hole formed on the wheel cover 50 will not be cracked due to external impact or vibration.

Figure 3:
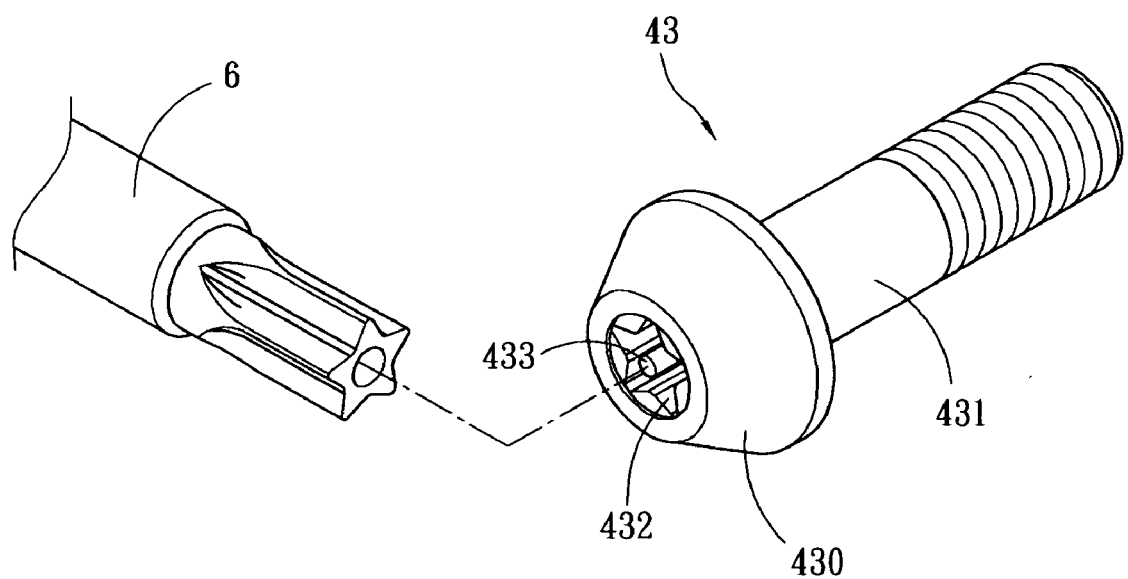
FIG. 3 shows a specially designed tool used to tighten or loosen the wheel cover with the fitting structure.

Referring to FIG. 3, the screw member 43 may include a bolt or a screw with a head 430 and a threaded rod 43 extending from the head 430. The top of the head 430 is formed with a polygonal or star-like wrench hole 432 of which the center is protruded as a pillar 433 allowing a specifically designed tool 6 (such as a screw driver) to screw or unscrew the screw member 43 with respect to the buffer element 42, so as to tighten or loosen the engagement between the wheel cover 50 and the loop 1. As the wheel cover 50 can only be disengaged or removed from the loop 1 as well as the wheel disk 5 by using the specifically designed tool 6, the wheel cover 50 is thus prevented from being easily stolen.

Figure 4:
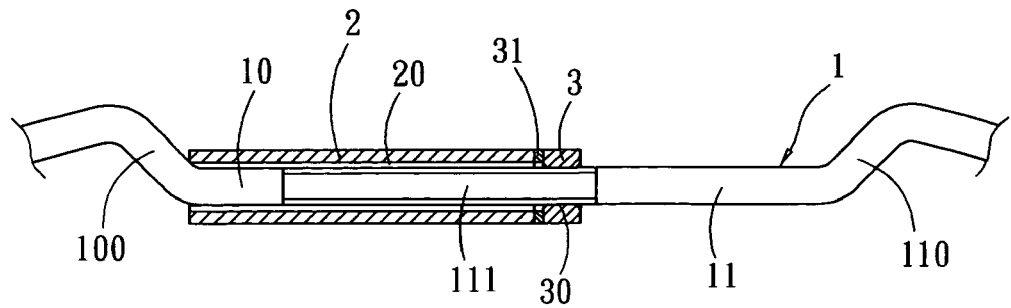
FIGS. 4 to 6 shows the adjustment of the diameter of the fitting structure.
Figure 5:
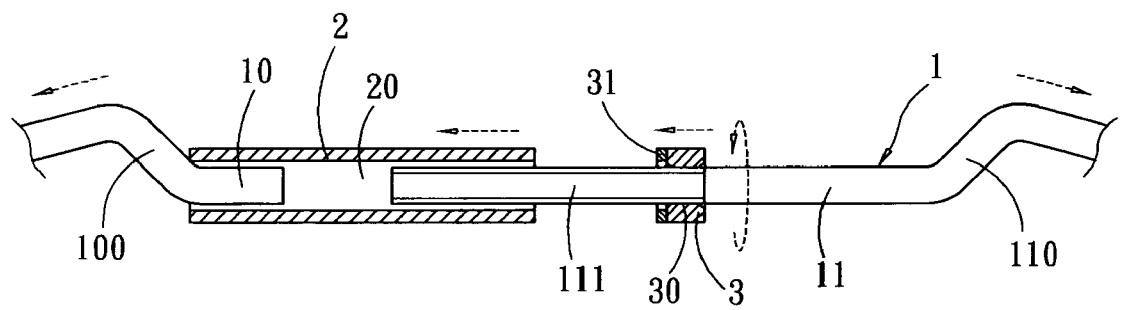
Figure 6:
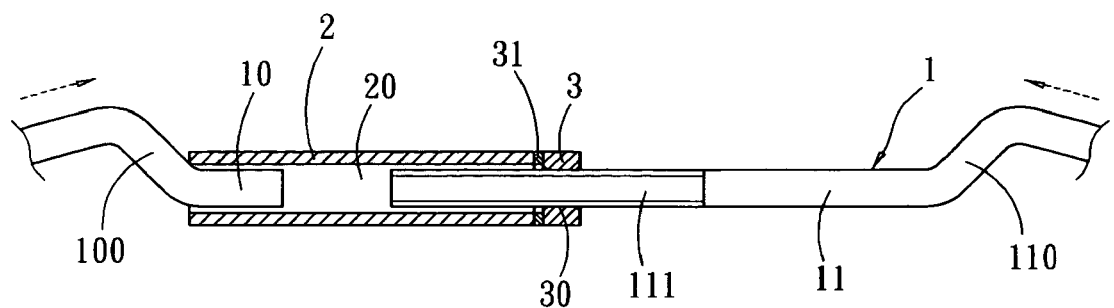

Referring to FIG. 4, the loop 1 has the spring and restoration features, the first and second ends 10 and 11 tend to approach each other. Therefore, by turning and displacing the nut 3, the connecting cover 2 can be pushed to increase the distance between the first and second ends 10 and 11. In this manner, the diameter of the loop 1 is increased. Alternatively, the connecting cover 2 can be pushed to bring the first and second ends 10 and 11 close to each other, such that a smaller diameter of the loop 1 is obtained. When the adjustment of the diameter of the loop 1 is too much, as shown in FIG. 5, one can pull the first and second ends 10 and 11 away from each, followed by turning the nut 3 to a desired position. Thereby, the restoration spring force of the loop 1 will then force the first and second ends 10 and 11 approaching each other as shown in FIG. 6.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fitting structure of a wheel cover, comprising:
    an open loop having a first end without threads and a second end with external threads, wherein both the first and second ends are straightly linear, and the first end extends from the loop through a bent portion;
    an adjusting nut engaged with the external threads of the second end;
    a connecting cover movably sheathing the first and second ends and being secured between the adjusting nut on the second end and the bent portion;
    a plurality of fitting seats, each including:
        a seat having a displacement slot;
        a holding member extending from one side of the seat for holding the loop therein; and
        a buffer member mounted to the seat at one side opposite to the holding member, the buffer member having one end extending into the displacement slot and the other end formed with a threaded hole; and
    a plurality of screw members, each being operative to extend through the wheel cover to engage with one of the buffer members.

2. The fitting structure of claim 1, wherein the screw member having a top recessed with a star-like hole.

3. The fitting structure of claim 2, the top of the screw member further comprises a pillar protruding from a center of the star-like hole.

4. The fitting structure of claim 1, wherein the first end is shorter than the second end.

5. The fitting structure of claim 1, wherein the second end is terminated with a bent portion on which the threads are formed.

6. The fitting structure of claim 1, further comprising a washer installed on the loop between the connecting cover and the adjusting nut.

7. The fitting structure of claim 1, wherein the connecting cover includes a hollow elongate channel allowing the first and second ends inserted therein from two opposing ends thereof.

8. The fitting structure of claim 1, wherein the holding member includes a resilient U-shaped member for holding the loop inserted therein.

9. The fitting structure of claim 1, wherein the holding member is fabricated from rubber.

10. The fitting structure of claim 1, wherein the screw member includes a screw or a bolt.

11. The fitting structure of claim 1, wherein each of the fitting seats further comprises a washer.

* * * * *